United States Patent
Bloch et al.

(10) Patent No.: US 10,474,334 B2
(45) Date of Patent: Nov. 12, 2019

(54) PROGRESS BAR FOR BRANCHED VIDEOS

(71) Applicant: JBF Interlude 2009 LTD—Israel, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Kfir Y. Rotbard, Ramat HaSharon (IL)

(73) Assignee: JBF Interlude 2009 LTD, Tel Aviv-Jaffa (IL)

( * ) Notice: Subject to any disclaimer, the term of this patent is extended or adjusted under 35 U.S.C. 154(b) by 388 days.

(21) Appl. No.: 14/639,579

(22) Filed: Mar. 5, 2015

(65) Prior Publication Data
US 2015/0199116 A1 Jul. 16, 2015

Related U.S. Application Data (63) Continuation of application No. 13/622,795, filed on Sep. 19, 2012, now Pat. No. 9,009,619.

(51) Int. Cl.
*G06F 3/0481* (2013.01)
*G11B 27/34* (2006.01)
(Continued)

(52) U.S. Cl.
CPC ........ *G06F 3/04842* (2013.01); *G06F 3/0482* (2013.01); *G06F 16/2246* (2019.01);
(Continued)

(58) Field of Classification Search
CPC ............. H04N 21/8541; H04N 21/472; H04N 21/482; H04N 21/47217; H04N 21/4825;
(Continued)

(56) References Cited

U.S. PATENT DOCUMENTS 4,569,026 A * 2/1986 Best .................... A63F 13/00
345/473
5,161,034 A * 11/1992 Klappert ............... G11B 19/00
386/234
(Continued)

FOREIGN PATENT DOCUMENTS

CA 2639491 A1 3/2010
DE 004038801 A1 6/1992
(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).
(Continued)

*Primary Examiner* — Tadesse Hailu
(74) *Attorney, Agent, or Firm* — Goodwin Procter LLP (57) ABSTRACT

A system for navigating and visualizing the progression of selectably presentable video content includes a progress indicator module for dynamically displaying the progression status of video content paths made up of selectably presentable video content segments. The system further includes an interactive control module for facilitating navigation along the video content paths. The progression status may be graphically represented in the form of a tree structure having linked video content segments forming the content paths. The control module may be used to navigate the video within this tree structure.

28 Claims, 5 Drawing Sheets

(51) Int. Cl.
*G06F 3/0484* (2013.01)
*G06F 16/74* (2019.01)
*G06F 16/22* (2019.01)
*H04N 21/488* (2011.01)
*H04N 21/845* (2011.01)
*H04N 21/8541* (2011.01)
*G06F 3/0482* (2013.01)

(52) U.S. Cl.
CPC ........... *G06F 16/743* (2019.01); *G11B 27/34* (2013.01); *H04N 21/488* (2013.01); *H04N 21/8456* (2013.01); *H04N 21/8541* (2013.01)

(58) Field of Classification Search
CPC .............. H04N 21/431; H04N 21/4312; A63F 2300/632; A63F 13/47; G06F 3/0482; G06F 3/04842; G06F 3/048; G06F 3/0484; G06F 17/30858; G06F 17/30327; G06F 17/30849; G06F 17/30064; G06F 17/30846; G06F 17/212; G06F 17/30852; G06F 17/30855
See application file for complete search history.

(56) References Cited

U.S. PATENT DOCUMENTS

| | | | |
|---|---|---|---|
| 5,568,602 A | 10/1996 | Callahan et al. | |
| 5,568,603 A | 10/1996 | Chen et al. | |
| 5,607,356 A | 3/1997 | Schwartz | |
| 5,636,036 A | 6/1997 | Ashbey | |
| 5,676,551 A | 10/1997 | Knight et al. | |
| 5,715,169 A | 2/1998 | Noguchi | |
| 5,734,862 A | 3/1998 | Kulas | |
| 5,737,527 A | 4/1998 | Shiels et al. | |
| 5,745,738 A | 4/1998 | Ricard | |
| 5,754,770 A * | 5/1998 | Shiels .................... A63F 13/00 348/E7.071 | |
| 5,818,435 A | 10/1998 | Kozuka et al. | |
| 5,848,934 A * | 12/1998 | Shiels .................... A63F 13/10 348/E7.071 | |
| 5,887,110 A | 3/1999 | Sakamoto et al. | |
| 5,894,320 A | 4/1999 | Vancelette | |
| 6,067,400 A | 5/2000 | Saeki et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,482 B1 | 10/2001 | Seidman et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,801,947 B1 | 10/2004 | Li | |
| 7,155,676 B2 | 12/2006 | Land et al. | |
| 7,231,132 B1 | 6/2007 | Davenport | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,472,910 B1 | 1/2009 | Okada et al. | |
| 7,627,605 B1 | 12/2009 | Lamere et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,065,710 B2 | 11/2011 | Malik | |
| 8,151,139 B1 | 4/2012 | Gordon | |
| 8,176,425 B2 * | 5/2012 | Wallace ................ G06F 3/0485 715/712 | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,612,517 B1 | 12/2013 | Yadid et al. | |
| 8,650,489 B1 | 2/2014 | Baum et al. | |
| 8,667,395 B2 | 3/2014 | Hosogai et al. | |
| 8,826,337 B2 | 9/2014 | Issa et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,367,196 B1 | 6/2016 | Goldstein et al. | |
| 9,390,099 B1 | 7/2016 | Wang et al. | |
| 9,465,435 B1 | 10/2016 | Zhang et al. | |
| 9,520,155 B2 | 12/2016 | Bloch et al. | |
| 9,530,454 B2 | 12/2016 | Bloch et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 2002/0053089 A1 | 5/2002 | Massey | |
| 2002/0086724 A1 | 7/2002 | Miyaki et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0124250 A1 | 9/2002 | Proehl et al. | |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0148806 A1 | 8/2003 | Weiss | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0009813 A1 | 1/2004 | Wind | |
| 2004/0019905 A1 | 1/2004 | Fellenstein et al. | |
| 2004/0034711 A1 | 2/2004 | Hughes | |
| 2004/0070595 A1 | 4/2004 | Atlas et al. | |
| 2004/0091848 A1 * | 5/2004 | Nemitz .................. A63F 13/10 434/365 | |
| 2004/0125124 A1 * | 7/2004 | Kim .................. G06F 17/30799 715/716 | |
| 2004/0128317 A1 | 7/2004 | Sull et al. | |
| 2004/0138948 A1 | 7/2004 | Loomis | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2005/0019015 A1 | 1/2005 | Ackley et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0166224 A1 | 7/2005 | Ficco | |
| 2005/0198661 A1 | 9/2005 | Collins et al. | |
| 2005/0210145 A1 | 9/2005 | Kim et al. | |
| 2005/0251820 A1 | 11/2005 | Stefanik et al. | |
| 2006/0002895 A1 | 1/2006 | McDonnell et al. | |
| 2006/0024034 A1 | 2/2006 | Filo et al. | |
| 2006/0028951 A1 | 2/2006 | Tozun et al. | |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0222322 A1 | 10/2006 | Levitan | |
| 2006/0224260 A1 | 10/2006 | Hicken et al. | |
| 2006/0274828 A1 | 12/2006 | Siemens et al. | |

(56) References Cited

U.S. PATENT DOCUMENTS

| | | |
|---|---|---|
| 2007/0003149 A1 | 1/2007 | Nagumo et al. |
| 2007/0024706 A1 | 2/2007 | Brannon et al. |
| 2007/0033633 A1 | 2/2007 | Andrews et al. |
| 2007/0055989 A1 | 3/2007 | Shanks et al. |
| 2007/0099684 A1* | 5/2007 | Butterworth ......... G11B 27/034 463/1 |
| 2007/0101369 A1 | 5/2007 | Dolph |
| 2007/0118801 A1 | 5/2007 | Harshbarger et al. |
| 2007/0157261 A1 | 7/2007 | Steelberg et al. |
| 2007/0162395 A1 | 7/2007 | Ben-Yaacov et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0055880 A1 | 2/2009 | Batteram et al. |
| 2009/0063681 A1 | 3/2009 | Ramakrishnan et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0069159 A1 | 3/2010 | Yamada et al. |
| 2010/0077290 A1 | 3/2010 | Pueyo |
| 2010/0088726 A1 | 4/2010 | Curtis et al. |
| 2010/0146145 A1 | 6/2010 | Tippin et al. |
| 2010/0153512 A1 | 6/2010 | Balassanian et al. |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0191684 A1 | 8/2011 | Greenberg |
| 2011/0191801 A1 | 8/2011 | Vytheeswaran |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0110618 A1 | 5/2012 | Kilar et al. |
| 2012/0110620 A1 | 5/2012 | Kilar et al. |
| 2012/0134646 A1 | 5/2012 | Alexander |
| 2012/0147954 A1 | 6/2012 | Kasai et al. |
| 2012/0179970 A1 | 7/2012 | Hayes |
| 2012/0198412 A1 | 8/2012 | Creighton et al. |
| 2012/0263263 A1 | 10/2012 | Olsen et al. |
| 2012/0308206 A1 | 12/2012 | Kulas |
| 2013/0028573 A1 | 1/2013 | Hoofien et al. |
| 2013/0031582 A1 | 1/2013 | Tinsman et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129308 A1 | 5/2013 | Kam et al. |
| 2013/0177294 A1 | 7/2013 | Kennberg |
| 2013/0188923 A1 | 7/2013 | Hartley et al. |
| 2013/0204710 A1 | 8/2013 | Boland et al. |
| 2013/0219425 A1 | 8/2013 | Swartz |
| 2013/0254292 A1* | 9/2013 | Bradley ................ H04L 65/403 709/204 |
| 2013/0259442 A1 | 10/2013 | Bloch et al. |
| 2013/0282917 A1 | 10/2013 | Reznik et al. |
| 2013/0308926 A1 | 11/2013 | Jang et al. |
| 2013/0328888 A1 | 12/2013 | Beaver et al. |
| 2014/0019865 A1* | 1/2014 | Shah ..................... G06F 3/0484 715/731 |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0094313 A1 | 4/2014 | Watson et al. |
| 2014/0101550 A1 | 4/2014 | Zises |
| 2014/0129618 A1 | 5/2014 | Panje et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0220535 A1 | 8/2014 | Angelone |
| 2014/0237520 A1 | 8/2014 | Rothschild et al. |
| 2014/0245152 A1 | 8/2014 | Carter et al. |

(56) References Cited

U.S. PATENT DOCUMENTS

| | | |
|---|---|---|
| 2014/0270680 A1 | 9/2014 | Bloch et al. |
| 2014/0282013 A1 | 9/2014 | Amijee |
| 2014/0282642 A1 | 9/2014 | Needham et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0046946 A1 | 2/2015 | Hassell et al. |
| 2015/0058342 A1 | 2/2015 | Kim et al. |
| 2015/0067723 A1 | 3/2015 | Bloch et al. |
| 2015/0104155 A1 | 4/2015 | Bloch et al. |
| 2015/0179224 A1 | 6/2015 | Bloch et al. |
| 2015/0181271 A1 | 6/2015 | Conn et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0331942 A1 | 11/2015 | Tan |
| 2016/0062540 A1 | 3/2016 | Yang et al. |
| 2016/0066051 A1 | 3/2016 | Caidar et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0277779 A1 | 9/2016 | Zhang et al. |
| 2016/0303608 A1 | 10/2016 | Jossick |
| 2016/0322054 A1 | 11/2016 | Bloch et al. |
| 2016/0323608 A1 | 11/2016 | Bloch et al. |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0289220 A1 | 10/2017 | Bloch et al. |
| 2017/0295410 A1 | 10/2017 | Bloch et al. |
| 2018/0025078 A1 | 1/2018 | Quennesson |
| 2018/0068019 A1 | 3/2018 | Novikoff et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2008005288 A | 1/2008 |
| KR | 2004-0005068 A | 1/2004 |
| KR | 2010-0037413 A | 4/2010 |
| WO | 1996/013810 A1 | 5/1996 |
| WO | WO-2000059224 A1 | 10/2000 |
| WO | WO-2007062223 A2 | 5/2007 |
| WO | WO-2007138546 A2 | 12/2007 |
| WO | WO-2008001350 A2 | 1/2008 |
| WO | WO-2008052009 A2 | 5/2008 |
| WO | WO-2008057444 A2 | 5/2008 |
| WO | WO-2009137919 A1 | 11/2009 |

OTHER PUBLICATIONS

Archos Gen 5 English User Manual Version 3.0, Jul. 26, 2007, pp. 1-81.

Barlett, Mitch, "iTunes 11: How to Queue Next Song," Technipages, Oct. 6, 2008, pp. 1-8, retrieved on Dec. 26, 2013 from the Internet http://www.technipages.com/itunes-queue-next-song.html.

Gregor Miller et al. "MiniDiver: A Novel Mobile Media Playback Interface for Rich Video Content on an iPhoneTM", Entertainment Computing A ICEC 2009, Sep. 3, 2009, pp. 98-109.

International Search Report for International Patent Application PCT/IL2012/000080 dated Aug. 9, 2012 (4 pages).

International Search Report for International Patent Application PCT/IL2012/000081 dated Jun. 28, 2012 (4 pages).

International Search Report for International Patent Application PCT/IL2010/000362 dated Aug. 25, 2010 (2 pages).

International Search Report and Written Opinion for International Patent Application PCT/IB2013/001000 dated Jul. 31, 2013 (12 pages).

Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).

Sodagar, I., (2011) "The MPEG-DASH Standard for Multimedia Streaming Over the Internet", IEEE Multimedia, IEEE Service Center, New York, NY US, vol. 18, No. 4, pp. 62-67.

Supplemental European Search Report for EP10774637.2 (PCT/IL2010/000362) dated Jun. 20, 2012 (6 pages).

Supplemental European Search Report for EP13184145 dated Jan. 30, 2014 (6 pages).

Yang, H., et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).

* cited by examiner

PROGRESS BAR FOR BRANCHED VIDEOS

CROSS-REFERENCE TO RELATED APPLICATION

This application is a continuation of U.S. patent application Ser. No. 13/622,795, filed on Sep. 19, 2012, and entitled "Progress Bar for Branched Videos," the entirety of which is incorporated by reference herein.

FIELD OF THE INVENTION

The invention relates generally to representing progress in a streaming video, and more particularly to systems and methods for navigating and visualizing the progress of selectably presentable branched video content.

BACKGROUND

A video progress bar is a component in a graphical user interface that is used to visualize both the progression of downloaded video (buffering) and the played or viewed video. Sometimes, the graphic is accompanied by a textual representation of the progress in a time- or percent-based format.

Typically, progress bars use a linear function, such that the advancement of a progress bar is directly proportional to the amount of video that has been completed from the total amount of video that will be played. However, varying disk, memory, processor, bandwidth and other factors often complicate this estimate.

Further, current progress indicators lack the ability to support the unique issues encountered when attempting to navigate and represent the progress of content that plays as a single, seamless video, but is made up of multiple paths and segments selectable in real-time by a viewer. Accordingly, there is a need for an visual progress indicator and accompanying navigation controls that facilitate user interaction with selectable video content.

SUMMARY OF THE INVENTION

The invention provides techniques and supporting systems for navigating and visualizing the progression of selectably presentable video content. To facilitate enhanced usability of user-facing media players, various implementations of the invention provide a progress indicator that dynamically displays the progression status of video content paths made up of selectably presentable video content segments while being viewed by a user. Aspects of the invention also provide an interactive control module that assists the user in their navigation along video content paths. The progression status is graphically represented in the form of a tree structure having linked video content segments forming the content paths, and the control module is used to navigation the video within this tree structure.

Therefore, in one aspect, a system for navigating and visualizing the progression of selectably presentable video content includes a progress indicator module for dynamically displaying the progression status of video content paths, each path made up of selectably presentable video content segments. The system further includes an interactive control module that allows a viewer to navigate along the video content paths and segments.

In some embodiments, the progression status includes a visual indicator that represents the portion of video content downloaded, the portion of video content played, and/or the portion of video content remaining for download. The progression status may include visual indicators identifying decision (branching) points. These indicators represent the points in a video when a transition may be made from one video segment to a second segment, which may be chosen from a set of multiple segment options.

In another embodiment, the progression status includes time markers that indicate when the decision points occur within the content. The time markers may be measured from the beginning of the video content path currently traversed by a viewer. The progression status may also display a time interval representing an amount of time permitted, upon reaching a decision point, for a viewer to choose which video content path to continue upon. In one embodiment, the progression status displays an amount of time until a decision point is reached.

In some embodiments, the progression status includes option indicators identifying each potential video content segment option that may be selected at a decision point. The option indicators may identify the selected segments after they are chosen at decision points. The progression status may be dynamically updated after each decision point along a traveled video content path.

In one instance, the progression status is represented as a graphical tree structure. The tree structure may contain linked video content segments forming a traveled video content path prior to a current point in time, and may further include potential segment selections branching from the content path after that point. In some embodiments, the tree structure includes linked video content segments forming all of the possible video content paths. The interactive control module may facilitate a viewer's navigation of the tree structure.

In some implementations, the progression status includes a display of statistics based on user selection of the video content segments, such as selections made by previous viewers of the video.

The progression status may include a video content length indicator. In some embodiments this length indicator is a maximum video duration based on a potentially followed video path that has the longest total length of video content segments. In other embodiments, the length indicator is a minimum video duration based on a potentially followed video content path having the shortest total length of video content segments. In yet other embodiments, the length indicator is based on the average duration of all possible video content paths.

In another embodiment, the system includes a preview module for displaying video thumbnails associated with a point in time along the video content paths. The thumbnails may represent previews of different video content segments potentially viewable at the point in time. The thumbnails may be from the currently viewed content segment, or, in other cases, from potentially viewable content segments. If the thumbnail is from a potentially viewable segment, upon selection of the video thumbnail the control module may seek to and/or display the video content segment corresponding to the thumbnail.

In another aspect, a method for navigating and visualizing the progression of selectably presentable video content includes the steps of dynamically displaying the progression status of video content paths, each path made up of selectably presentable video content segments. The method further includes the step of facilitating navigation along the video content paths.

In some embodiments, the progression status includes a visual indicator that represents the portion of video content downloaded, the portion of video content played, and/or the portion of video content remaining for download. The progression status may include visual indicators identifying decision (branching) points. These indicators represent the points in a video when a transition may be made from one video segment to a second segment, which may be chosen from a set of multiple segment options.

In another embodiment, the progression status includes time markers that indicate when the decision points occur within the content. The time markers may be measured from the beginning of the video content path currently traversed by a viewer. The progression status may also display a time interval representing an amount of time permitted, upon reaching a decision point, for a viewer to choose which video content path to continue upon. In one embodiment, the progression status displays an amount of time until a decision point is reached.

In some embodiments, the progression status includes option indicators identifying each potential video content segment option that may be selected at a decision point. The option indicators may identify the selected segments after they are chosen at decision points. The progression status may be dynamically updated after each decision point along a traveled video content path.

In one instance, the progression status is represented as a graphical tree structure. The tree structure may contain linked video content segments forming a traveled video content path prior to a current point in time, and may further include potential segment selections branching from the content path after that point. In some embodiments, the tree structure includes linked video content segments forming all of the possible video content paths. The method may further include facilitating a viewer's navigation of the tree structure.

In some implementations, the progression status includes a display of statistics based on user selection of the video content segments, such as selections made by previous viewers of the video.

The progression status may include a video content length indicator. In some embodiments this length indicator is a maximum video duration based on a potentially followed video path that has the longest total length of video content segments. In other embodiments, the length indicator is a minimum video duration based on a potentially followed video content path having the shortest total length of video content segments. In yet other embodiments, the length indicator is based on the average duration of all possible video content paths.

In another embodiment, the method further includes the step of displaying video thumbnails associated with a point in time along the video content paths. The thumbnails may represent previews of different video content segments potentially viewable at the point in time. The thumbnails may be from the currently viewed content segment, or, in other cases, from potentially viewable content segments. If the thumbnail is from a potentially viewable segment, upon selection of the video thumbnail the video may seek to and/or display the video content segment corresponding to the thumbnail.

Other aspects and advantages of the invention will become apparent from the following drawings, detailed description, and claims, all of which illustrate the principles of the invention, by way of example only

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various embodiments of a dynamic progress indicator and interactive controls that provide for the visualization and navigation of selectably presentable video content. The progress indicator may be used in conjunction with seamlessly assembled and presented streaming video content, such as that described in U.S. patent application Ser. No. 13/033,916, entitled "System and Method for Seamless Multimedia Assembly," and filed Feb. 24, 2011, the entirety of which is hereby incorporated by reference. Selectably presentable video content may include, for example, one or more separate video content paths and/or segments that are seamlessly presented to a viewer as a continuous video without noticeable interruptions in video and audio playback between segments. In some instances, the viewer is permitted to make choices at one or more various decision points interspersed throughout the video content, resulting in the corresponding video segment(s) and/or path(s) associated with the choices to be presented to the viewer in the selected order.

Because of the distinctive characteristics of selectably presentable video content, such as varying numbers of video segments, video segment lengths, different audio tracks and the like, these videos benefit from a special dynamic indicator and controller that can visually represent the progression of video play and buffering/download within multiple-path structures and enable viewer-directed navigation among the various paths of the video. The indicator may show progress information in real-time, and update frequently in order to present status correctly. Navigation may also be performed in real-time, and may be functionally integrated into the progress indicator and/or performed using separate buttons or other interactive controls.

The progress indicator may take several forms, with each representing the progress of branching video content. Although the indicators are represented and referred to herein as horizontal bars arranged in lines or trees, it is to be appreciated that this is an exemplary embodiment of the invention, and the progress indicators may take any suitable form, shape or orientation while still accomplishing the objects of the invention. Such forms may include, but are not limited to, circles, ovals, arcs, spirals, dials, gauges, and other forms suitable for representing progress and other information associated with media content.

Further, although the progress indicators are described herein with respect to video playback, the invention is applicable to streaming and non-streaming media, including audio, animation, video games, interactive media, and other forms of content usable in conjunction with the present systems and methods. Streaming media may include, for example, multimedia content that is continuously presented to a viewer while it is received from a content delivery source, such as a remote video server on the Web.

Figure 1:
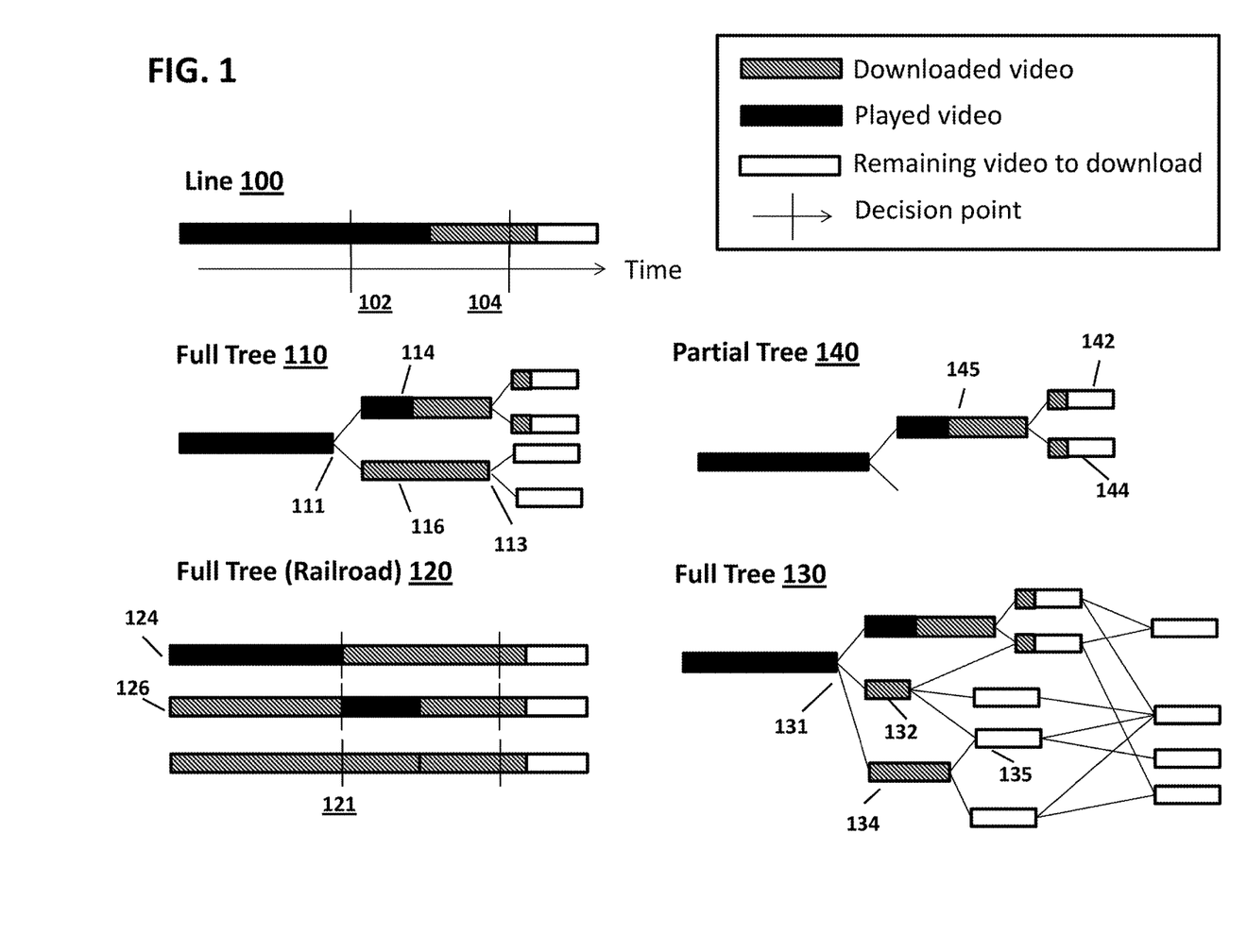
FIG. 1 is an exemplary diagram of progress indicator structures according to an embodiment of the invention.

FIG. 1 illustrates exemplary forms that the progress indicator may take. In the line form 100, progress is represented as a single dynamic bar that presents different video selection options at decision points. In the depicted example, there are two decision points 102, 104. Upon selection of a particular content segment, the bar adjusts to accommodate the selection, for example, by changing the video length and updating progress statuses accordingly. The addition of the selected content may increase the length of the bar. In other instances, the existing bar and/or segments of the bar are resized to accommodate the new content while retaining a fixed overall bar length.

In some embodiments, the progress indicator is visually represented as a tree. This may include a tree structure form in which there are one or more starting video content segments, and at the end of each segment (and/or upon reaching a decision point), the segment branches out to one or more selectable content segments. Accordingly, as illustrated, a viewer may follow a left-to-right path containing various connected segments. One skilled in the art will appreciate that the tree structures described and depicted herein are merely exemplary embodiments, and any suitable progress status structure may be used to represent the branching media content. Such structures may include, but are not limited to, graphs, lists, flowcharts, hierarchical structures, state diagrams, and/or any combination of the foregoing.

The full tree form may include a visual representation of all video content paths. Still referring to FIG. 1, a full tree may take multiple forms. Full tree progress bar 110 is a simple form branching tree for a video that has a single starting point (video segment), then, at the first decision point 111, branches into two paths having different video segments 114, 116, each segment 114, 116 of equivalent length. Because these particular segments 114, 116 are the same length in this example, the second decision point 113 occurs at the same time for both paths. At this decision point 113, the paths split again, providing a total of four possible outcomes (ending video segments) and four possible paths that can be followed when viewing the video.

Full tree progress bar 120 is represented in railroad form; that is, one or more possible paths are represented as a single, contiguous tracks made up of their respective individual video content segments. At a decision point, a viewer may select an option that results in the video proceeding down a different path. For example, and as illustrated, at decision point 121, the viewer has made a choice (or the video player has automatically made a selection) resulting in the video previously playing on path 124 to continue instead on path 126.

In an additional example of the full tree form, progress bar 130 includes a number of content segments of varying length, forming numerous paths that can be taken throughout the viewing/downloading of a video. After the first decision point 131, the following video content segments each have different lengths. Thus, subsequent decision points occur at different times depending on which path is traversed. Video content segments may be shared among paths; for example, segment 135 can be reached after a decision point in both segments 132 and 134.

In the partial tree form 140, rather than displaying all possible video paths and/or segments, only a subset of the paths/segments is shown. For example, partial tree progress bar 140 shows only the segments of the path that have been played up to the current point in time 145, as well as the available choices 142, 144 after that time 145. The visual display may be limited to the available choices branching from the current video segment, or it may include all potential future segments. Past paths not followed and/or future segments not yet selected may be permanently hidden, or may be shown to a viewer by, for example, setting a preference or operating a GUI control.

In some embodiments, the progress bar structure is loaded prior to the video content loading, while in other embodiments, the progress bar and video content load in parallel. The progress indicator may be fully presented from the beginning of play, with chosen segments highlighted after each decision point. Alternatively, the bar may be shown only up to a certain point (e.g., up to the amount of video loaded (buffered), up to the amount of video played, or up to the end of the current video segment). The progress bar may dynamically add or remove video segments and/or paths from its display while the video is playing. In some embodiments, intelligent buffering of the video, audio, and/or other media content is performed as described in U.S. patent application Ser. No. 13/437,164, entitled "Systems and Methods for Loading More Than One Video Content at a Time," and filed Apr. 2, 2012, the entirety of which is hereby incorporated by reference.

Traversal of the video content may be performed by selecting among options that appear on and/or around the video while the video is playing. The video segment that is played after the current playing segment is determined based on the option selected. Each option may result in a different video segment being played. The transition to the next video segment may be done immediately upon selection, at the end of the current segment, or at some other predefined point. Notably, the transition between content segments may be seamless. In other words, the video may continue playing regardless of whether segment selection is made, and no noticeable gaps appear in audio or video playback between any connecting segments. In some instances, the video continues on to a following segment after a certain amount of time if none is chosen, or may continue playing in a loop. If a video segment is missing, corrupted, or has otherwise failed to load, the progress bar may provide an indicator that the segment is missing and enable a viewer to jump to the end of (or past) the missing segment at any time.

The progress indicator may include various visualized information items in graphical and/or textual form. This information may include, for example, the progression of downloaded video content, the progression of played video content, and/or a percentage value representing the foregoing progressions. When displayed in a tree form, the progress indicator may show this information for each branch and/or content segment. In some embodiments, the progress indicator includes markers delineating branching points; i.e., points (or ranges) in time at which the viewer can select to transition to a new video content segment. These decision point markers may be placed at the ends of content segments (i.e., at the point of transition to the next content segment), or at any point (or range in time) in a video segment where a viewer is permitted to select a video path to traverse.

Figure 2:
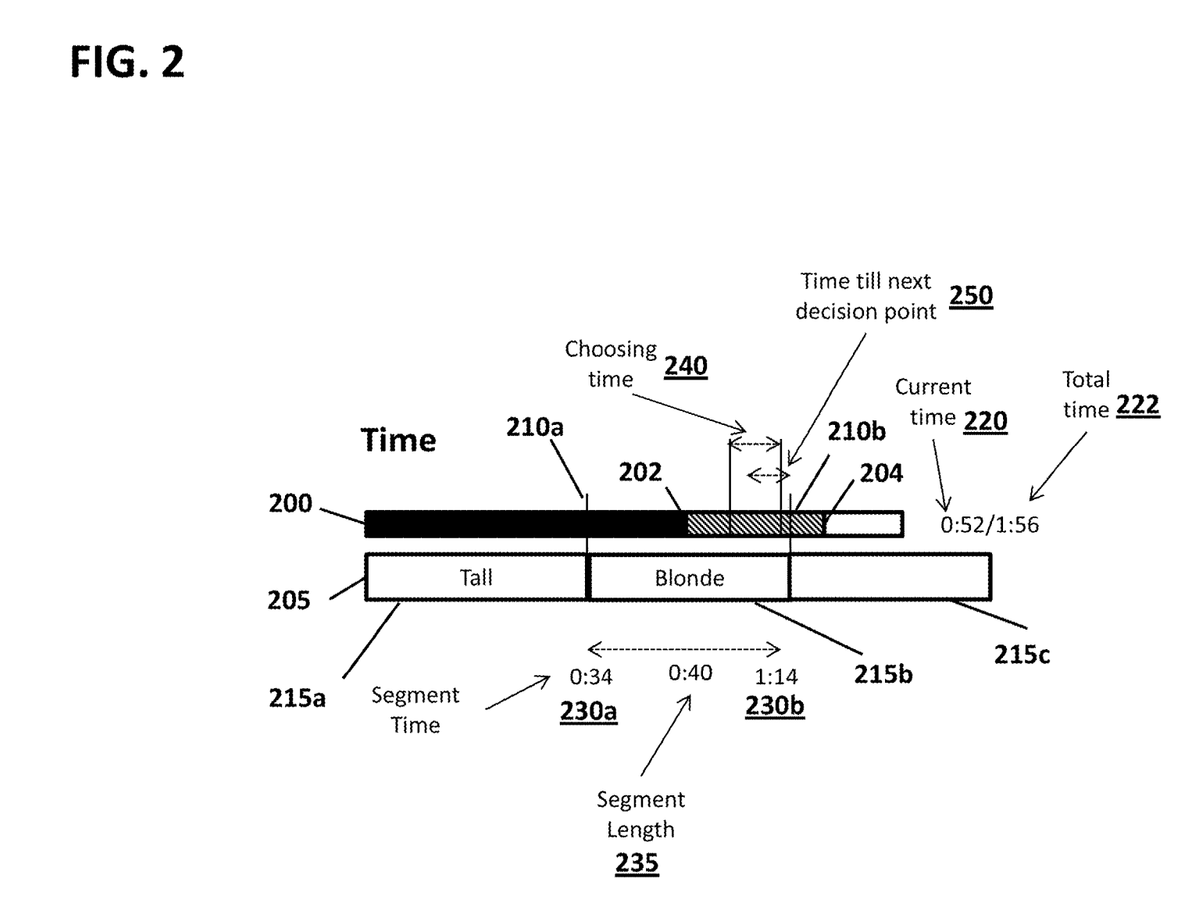
FIG. 2 is an exemplary diagram of a progress indicator with various time markers according to an embodiment of the invention.

In some embodiments, the progress indicator includes time-based information for presentation to a viewer. FIG. 2 depicts a progress bar 200 associated with a video content path indicating that the video has been played up to point 202 and has buffered up to point 204. A second bar 205 displays the options selected up to the current point in time 202. This bar 205 may be represented separately, as depicted, or may be combined with or superimposed onto video progress bar 200. Progress bars 200, 205 are separated into three segments, with the separation between each segment defined by a decision point 210a, 210b. Segments 215a and 215b of progress bar 205 show that an option was selected (whether automatically or by a viewer) at a preceding decision point, and so the video content played during those segments corresponds with the respective selected options.

In one example, the video associated with the progress bars 200, 205 is a music video in which the viewer selects options at the decision points 210a, 210b to determine what content will be played. For the first segment 215a, the viewer may select either a tall or short performer to sing the first verse of the song. As shown, the "Tall" option is indicated as having been selected; thus, the video associated with the tall performer was played during segment 215a. Likewise, at decision point 210a, the viewer was provided with options to have either a blonde or brunette performer sing the second verse. Segment 215b of progress bar 205 indicates that the "Blonde" option was selected, and the video playing at current time 202 is therefore associated with that selection. Decision point 210b has not yet been reached, thus no selection is indicated as having been made for segment 215c.

Still referring to FIG. 2, the progress indicator(s) 200, 205 may include time information such as the current time of play 220 (measured from the beginning of the video and/or the beginning of the current video segment), the total video time 222 (further explained below), the time of each decision (branching) point 230a, 230b (measured from the beginning of video and/or the beginning of the current video segment), the time length of the current video segment 235 (or all or a subset of segments), the time interval(s) in which a viewer must select an option 240 (if any), and the time until the next branching point is reached 250.

In some embodiments, the progress indicator includes various statistics associated with the video content and dynamically displayed and updated in real-time. The statistics associated with the video content may include those described in U.S. patent application Ser. No. 13/034,645, entitled "System and Method for Data Mining within Interactive Multimedia," and filed Feb. 24, 2011, the entirety of which is hereby incorporated by reference. The statistical information may be textually or graphically presented, e.g., as icons, in different colors, pictures, and/or videos. The information may appear as interactive elements on the video itself, or as part of the progress indicator.

The statistics may be associated with viewer selections based on previous plays of a video by the viewer, the viewer's friends, social networking connections, and/or all other users. For the example, the progress bar may display how popular a particular option is, and/or how many times a particular option was chosen (see FIG. 3), and may include a list of connections (e.g., Facebook friends, email contacts, Twitter followers, etc.) that chose the same option (or an indication of what option(s) were instead chosen). These statistical displays may be dynamically updated as viewers watch videos and make choices. For example, if each viewer in a group of Facebook friends separately watches a particular video at the same time, each may see various statistical indicators on the progress bar update in real-time as friends make selections on which video content paths to follow.

Stylized markers (e.g., stars, text, or other graphical icons) may be superimposed on or otherwise associated with the progress bar when a viewer selects the most popular option at a decision point. Previously followed video content paths may be shown in a different color or otherwise highlighted upon subsequent plays. For example, the current traversed video path may be shown in blue, while previously followed paths are colored yellow. The statistics may also be based on the structure of the video, for example: the number of video paths available to a viewer (this may be dynamically updated after each decision point), the number of overall possible paths, and/or the number of paths viewed out of the total number of possible paths.

Figure 3:
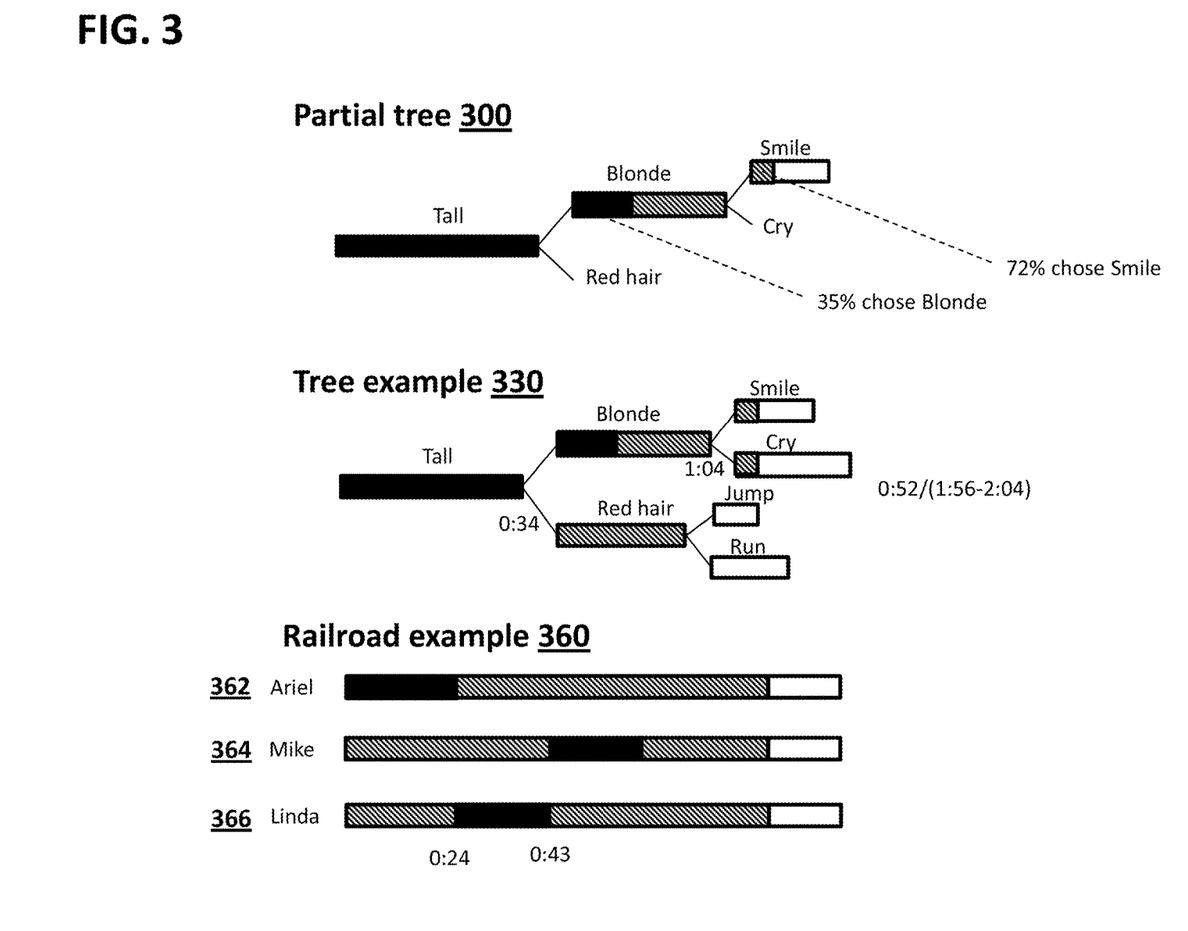
FIG. 3 is an exemplary diagram of progress indicator structures with selection option markers according to an embodiment of the invention.

As described above, the progress bar may include text or graphics indicating the options available for selection at decision points and/or the options that have previously been selected. These options may be displayed differently depending on the progress indicator structure. As illustrated in FIG. 3, for tree structures 300, 330, the options may appear on every content segment for the entire tree, or may only appear on a subset of segments, such as those segments on potentially viewable video content paths and/or paths already traversed. With respect to a railroad structure 360, the options 362, 364, 366 may appear from the beginning of each track, or may appear as the options are approached while viewing the video. In some embodiments, the progress indicator does not display any options until a particular option is selected. In that instance, the selected option may then be displayed on the progress indicator, and additional options may be shown as they are selected.

In some embodiments, the options are hidden and do not initially appear on the progress indicator. In these instances, a hidden option may be displayed on the indicator only after it is selected or discovered by a viewer while playing the video. In other embodiments, certain options are not shown and/or made available to all or a subset of viewers. For example, in some circumstances, the video may be played in a "passive" mode, meaning that the viewer cannot make some or all of the choices that would be available during a normal play-through of the video. Passive mode may be used to replicate a play-through using previously made or predefined selections, and may, for example, allow a viewer to share his or her version of a video (i.e., the traversed path) with other viewers. In some instances, options may be hidden from viewers based on the location they are viewing the video from. For example, some video segments may contain copyrighted material not licensed for display in certain countries; thus, any options leading to those segments may be hidden and/or replaced by other options.

Figure 4:
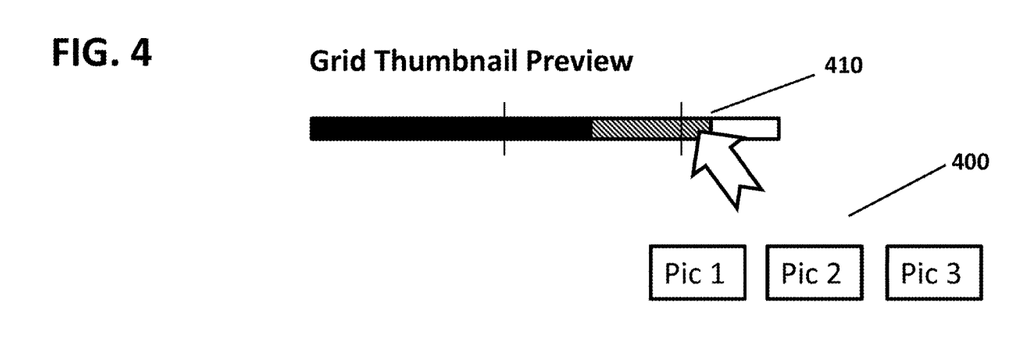
FIG. 4 is an exemplary diagram of a thumbnail preview grid for a progress indicator according to an embodiment of the invention.

Referring to FIG. 4, the progress indicator may provide thumbnail previews of video content 400 when a user interacts with the indicator. For example, upon hovering over or selecting a point in time 410 on the progress bar configuration, the viewer may be shown a thumbnail image or video of one or more of the possible options that may be viewed at that point. As illustrated, if at the selected point in time 410 the viewer may be traversing any one of three potential paths, then three thumbnails 400 are displayed to the viewer, each representing a separate one of the potential paths.

Thumbnail previews may be shown for points before and/or points after the current point in time of the video. For points prior to the current time, the thumbnails displayed may include all possible paths at that time, or may only include the path traversed by the viewer. For points after the current time, the thumbnails displayed may include all possible paths at that time regardless of previous choices made, or may only include the paths available to the viewer based on selections previously made in viewing the video. The thumbnails may be presented in a grid or any suitable format. As further described below, the viewer may select one of the thumbnails to navigate to that point in the video.

The video may be controlled by a set of navigation and playback controls. In one embodiment, there are two types of controllers: constant and content. Constant controllers do not change form significantly (or at all) during most or all of the video playback. These controllers may be disposed outside the video, e.g., adjacent to the progress bar, and may include standard button controls such as play, pause, seek, enable/disable subtitles, and the like. Some constant controls may affect audio, video, and/or an interactive layer that sits on top of the video. For example, if the user pauses a video, the audio and interactive layer may be paused as well. Content controllers may appear on the video during playback as part of the interactive layer; these controls may be associated with the video content and may control and/or interact with it. Content controllers include, for example, the selectable options that appear prior to branching points that allow a viewer to decide how the video will continue. The interactive layer may also include links, pop-ups, advertisements, and/or other content that may permit user interaction and/or direct the viewer to other websites, videos, etc. upon selection.

Constant controls on or near the progress indicator may include a play button to start or continue playing the video, audio, and/or interactive layer, and a pause button to pause playback. While a video is paused and/or stopped, buffering of the content may continue, and in some instances, the interactive layer may continue to function so that a viewer can select a content option at a decision point while playback is paused and have the resulting selection affect the video after resuming play. A stop button may be included to allow a viewer to return to beginning of the video. In some instances, a viewer's previously selected options persist after stopping the video. Volume control and mute toggling buttons may also be included as constant controls.

The playback controls may further include seek buttons for navigating the various paths and segments of the video. Fast-forward and/or fast-backward buttons may adjust the viewer's position in the video accordingly, or may seek in fixed increments, such as three-second, five-second, or ten-second jumps. A "snap-seek" function may be provided that allows the viewer to seek predefined points in the video, such as immediately prior to decision points. Upon seeking backwards, the viewer's previous selections may be saved or reset. Upon seeking forward past a decision point, the video player may automatically select a decision (e.g., default, last used, most common), or may use a previous selection made by the viewer, if any. If the viewer attempts to seek to a point on the video timeline that has yet to be buffered, a "loading" indicator may be displayed while the video downloads.

The progress bar itself may be used for navigating within a progress status tree structure, and may include various interactive controls for doing so. For example, a viewer may jump to a specific point on the tree by selecting and/or clicking on that point. Markers on the progress bar may also be selected as specific jump points; for example, a the progress bar may display predefined time stamps and/or segment identifiers that may be selected, whereby a viewer is directed to a the identified time or segment. These markers may be placed, for example, shortly before branching points to allow the viewer to select a path to follow, shortly after branching points, or at any other point on a video content path. Again, a "loading" indicator may be displayed if the viewer attempts to view video that has not yet been buffered.

As described above, navigation controls may also include the ability to seek to a particular point in time or segment in the video by selecting a thumbnail from a group of one or more thumbnails that appears when hovering over a point on the progress bar. In selecting a particular segment to seek to, it may be assumed that the option(s) selected at decision point(s) prior to that segment (if any) are those that would need to have been made to reach the segment corresponding to the selected thumbnail. These assumed selections may be tracked for statistical purposes as previously described.

Upon seeking, the video, audio, and interactive layer remains synchronized, such that the selected segment presented to the viewer includes the same audio, video, and interactive components that would have been presented to the viewer had reached the same point without seeking. In other cases, different video, audio, and/or interactive components may be presented to the viewer, such as modified or customized options at decision points.

When the progress indicator is structured in a line form (see FIG. 1), special considerations may be taken to determine how to display the video length and progress after the current point of playback. For example, at a decision point in the video, a viewer may have the option of either continuing down a path that is two minutes long or one that is four minutes long. Because each video path may have different numbers of segments, and each segment may vary in duration, the progress bar display may accommodate these variations as well as other differences in video segments that may affect progress calculations. This information associated with the progress bar may be dynamically updated and recalculated throughout progression of the video, and/or after each decision point or selection of a video segment option.

The following methods may be used to estimate the total amount of time remaining in a video, and adjust the progress display accordingly: (1) assume that default selections are made for all remaining decision points; (2) use the decision point selections from the previous playback; (3) use decision point selections previously made by the current viewer and/or other viewers; (4) use the most common selection at each remaining decision point; (5) assume the longest duration path is traversed (i.e., determine the maximum total duration of each possible combination of remaining video segments); (6) assume the shortest duration path is traversed (i.e., determine the minimum total duration of each possible combination of remaining video segments); (7) use the average duration of the possible remaining paths; and/or (8) use the average duration of all possible remaining segments. In some versions the viewer may select which estimation methods are used. The progress status may display more than one calculated value; for example, the minimum and maximum times left to play may be shown together. In instances where the total video length is desired (not just the remaining length), the above calculations may include the durations of the already-traversed segments, or may include the durations of the maximum, minimum, and/or average segments or paths, regardless of whether or not traveled.

Figure 5:
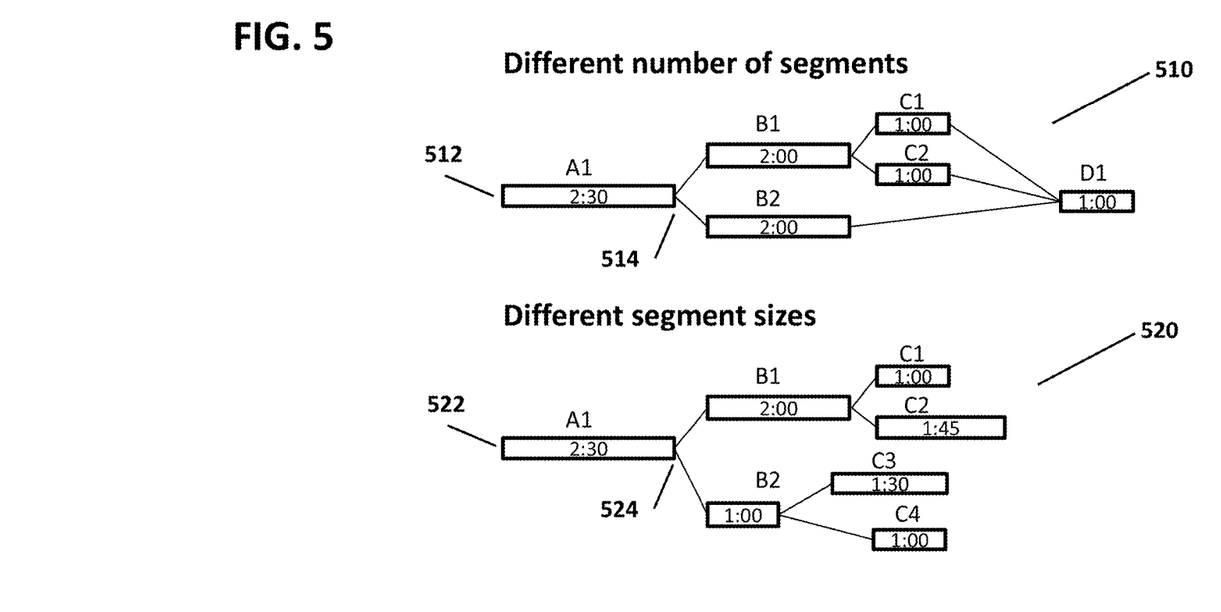
FIG. 5 is an exemplary diagram of progress indicator structures having various segment sizes and path lengths according to an embodiment of the invention.

FIG. 5 illustrates an example of calculating the maximum duration of a video when the paths contain different numbers of segments. With respect to tree structure 510, at the start of the video 512, the maximum duration path includes segments A1+B1+C1+D1 for a total video length of six minutes and thirty seconds. If, at decision point 514, a viewer selects segment B2, the remaining maximum duration is B2+D1 (three minutes), with a total video length of A1+B2+D1 (five minutes and thirty seconds).

Referring further to FIG. 5, tree structure 520 is used to illustrate the calculation of an average video duration in a video having varying segment sizes at single decision points. At the beginning of the video 522, there are four possible paths that may be followed by a viewer: A1+B1+C1 (five minutes and thirty seconds); A1+B1+C2 (six minutes and fifteen seconds); A1+B2+C3 (five minutes); and A1+B2+C4 (four minutes and thirty seconds). The average duration of all these paths is approximately five minutes and nineteen seconds, and this value may be displayed on the progress bar as the total video length. If, at decision point 524, option B2 is selected, the paths containing B1 may be disregarded in calculating the average length. Accordingly, the total video length would then be updated to display the average of paths A1+B2+C3 and A1+B2+C4, or four minutes and forty-five seconds. The total remaining video length may be calculated by taking the average of paths B2+C3 and B2+C4, or by any other suitable calculation as described above.

In some instances, the video allows for an option at a decision point to return the viewer to a segment at an earlier point in the same or a different video path, essentially allowing the viewer to enter into a video loop. In response to a looping action, the progress indicator may return the playback cursor to the desired segment on the line or tree structure, or, alternatively, the cursor may remain at the current point and the length of play may be recalculated appropriately (e.g., the video length may be extended by the length of the looped part, or an alternate method of calculation as described above may be used). To accommodate the extended playback, the progress bar may extend its length or resize its existing representation of segments to fit the looped portion.

Figure 6:
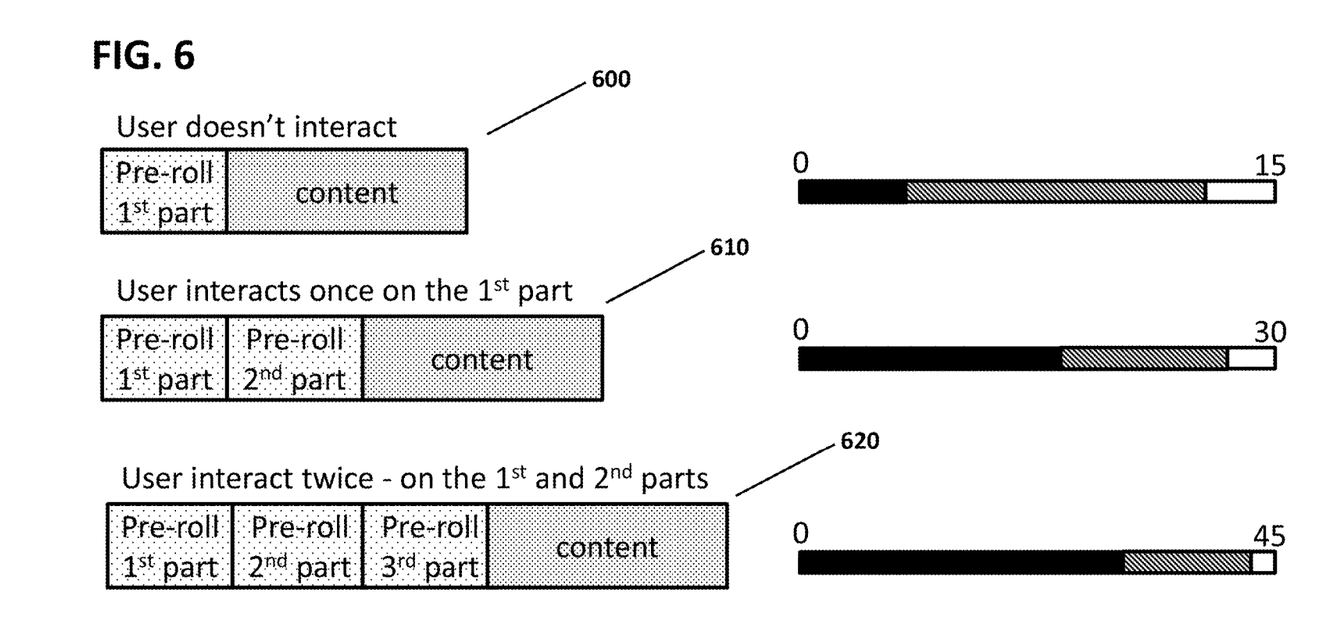
FIG. 6 is an exemplary diagram of unfolding video and associated progress indicators according to an embodiment of the invention.

In the instance of "unfolding" videos, the configuration of the progress bar as well as its associated time markers and other information may be updated as the video progresses. As shown in FIG. 6, the video unfolds when a viewer interacts with it. For example, a streaming video clip on a website may include a fifteen-second pre-roll advertising segment prior to playing the clip content. If a viewer does not interact 600 with the advertisement, the pre-roll completes after fifteen seconds and the content is played. If, however, the viewer interacts once 610 with the advertisement, the pre-roll adds an additional fifteen-second segment to allow for further interaction. If the viewer then interacts a second time 620 with the advertisement, the pre-roll is further extended. The unfolding of the pre-roll prior to playing the content may continue indefinitely, or may cease after a certain number of segments are added. As the video unfolds, the progress bar is updated to accommodate the additional length.

Figure 7:
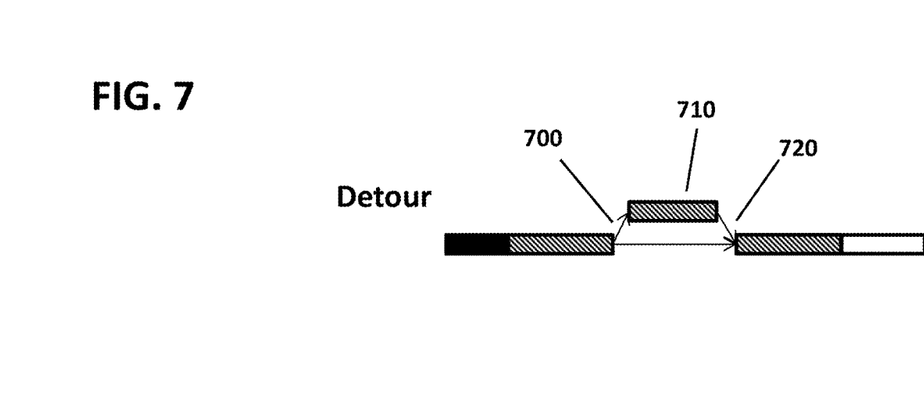
FIG. 7 is an exemplary diagram of a detour in a progress indicator according to an embodiment of the invention.

In some embodiments, the progress indicator may support video detours; that is, interrupting the playback of the current video to view another video, and returning to the previous point in playback after the detour video completes playback or is otherwise terminated. Referring to the tree structure progress bar illustrated in FIG. 7, at point 700 at viewer may be given an option to watch a detour video. For example, the currently playing video may include an actor using a new video game system, and an interactive control is provided to the viewer to temporarily break from the video to watch an advertisement for that product. If the viewer opts to watch the detour video 710, playback may resume immediately after the point of the detour 720, or may continue at some other point in the video. If the progress bar is represented in a line form, the bar may be presented without the detour segment. If the detour is taken, the bar may be increased in size by the detour length, and/or the time indicators associated with the bar may be recalculated and updated.

In various embodiments, the behavior of the progress indicator may dynamically change in order to influence the perception of the viewer. For example, the graphical progress playback status of the video may appear to speed up for several seconds leading up to a decision point. The playback progression status may pause at various points during the video without also pausing the corresponding video and audio content. Other instances of progress acceleration and/or deceleration may be utilized for effect. In some instances, the graphical effects such as pulses, ripples, coloring, and the like are applied to the progress indicator.

In some embodiments, an interactive content authoring tool is used to create the selectably presentable video content described herein. The progress bar may be included as part of the authoring tool to assist in the formation of this content.

One skilled in the art will recognize the various forms in which the systems and methods described herein may be implemented. For example, the invention may include a progress indicator module for progress, status, and statistical information for video content, and an interactive control module for navigating the video content. These functions may be implemented in any appropriate hardware or software. If implemented as software, the invention may execute on a system capable of running a commercial operating system such as the Microsoft Windows® operating systems, the Apple OS X® operating systems, the Apple iOS® platform, the Google Android™ platform, the Linux® operating system and other variants of UNIX® operating systems, and the like.

The software may be implemented on such hardware as a smart or dumb terminal, network computer, personal digital assistant, wireless device, smartphone, game machine, music player, mobile telephone, laptop, palmtop, wireless telephone, information appliance, workstation, minicomputer, mainframe computer, or other computing device, that is operated as a general purpose computer or a special purpose hardware device that can execute the herein described functionality. The software may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in a multi-platform language/framework such as Java, .Net, Objective C, or in native processor executable code. Illustratively, a programming language used may include assembly language, Ada, APL, Basic, C, C++, C#, Objective C, COBOL, dBase, Forth, FORTRAN, Java, Modula-2, Pascal, Prolog, REXX, and/or JavaScript, for example.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The system can include client and servers computers. A client and server are generally remote from each other and typically interact over a communication network. The relationship of client and server arises by virtue of computer programs running on the respective computers and having a client-server relationship to each other.

In various embodiments, the client computers include a web browser, client software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the client automatically makes requests with the web browser. Examples of commercially available web browser software are Microsoft® Internet Explorer®, Mozilla® Firefox®, and Apple® Safari®.

In some embodiments, the client computers include client software. The client software provides functionality to the client that provides for the implementation and execution of the features described herein. The client software may be implemented in various forms, for example, it may be in the form of a web page, widget, and/or Java, JavaScript, .Net, Silverlight, Flash, and/or other applet or plug-in that is downloaded to the client and runs in conjunction with the web browser. The client software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software. The client software may also be in the form of a standalone application, implemented in a multi-platform language/framework as described above.

A communications network may connect the clients with the servers. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used In a client-server environment, the servers may be implemented on one or more server class computers that have sufficient memory, data storage, and processing power and that run a server class operating system (e.g., Oracle® Solaris®, GNU/Linux®, and the Microsoft® Windows® family of operating systems). Other types of system hardware and software than that described herein may also be used, depending on the capacity of the device and the number of users and the size of the user base.

Although internal components of the computer are not shown, those of ordinary skill in the art will appreciate that such components and the interconnections are well known. Accordingly, additional details concerning the internal construction of the computers need not be disclosed in connection with the present invention.

What is claimed is:

1. A system for navigating branching video content, the system comprising:
   a memory storing computer-executable instructions; and
   a processing unit that, in executing the instructions stored on the memory, is programmed to perform operations comprising:
      providing for display a progress status of a branching video comprising a plurality of video content paths, each content path comprising a plurality of selectably presentable video content segments, wherein the progress status comprises a navigable video tree structure of one or more of the video content paths, the navigable video tree structure configured to be displayed simultaneously with the playback of the branching video;
      receiving a user interaction with the progress status indicative of a navigation of the video tree structure; and
      navigating to a location in the branching video based on the user interaction and one or more branching points in the video tree structure, the location is (i) later in time than a current location in the branching video and (ii) after a plurality of branching points and two or more video content segments of the plurality of selectably presentable video content segments that have not been reached in playback of the branching video, and wherein the navigating comprises automatically selecting a video content path at each branching point, of the plurality of branching points, in the branching video between the current location and the location later in time.

2. The system of claim 1, wherein the navigation of the video tree structure further comprises a navigation to a position in the branching video that is earlier in time than a current position in the branching video.

3. The system of claim 2, wherein the earlier position in the branching video refers to a video content segment not previously viewed by a current user.

4. The system of claim 1, wherein the progress status comprises a navigable video tree structure of a plurality of the video content paths.

5. The system of claim 1, wherein the progress status further comprises one or more statistics associated with the branching video, and wherein the operations further comprise updating the one or more statistics in real time.

6. The system of claim 5, wherein the one or more statistics are based on choices made with respect to branching points in the video tree structure by a plurality of different users.

7. The system of claim 1, wherein the progress status further comprises at least one visual indicator identifying a branching point for transitioning from a source video content segment to a selectable one of a plurality of target video content segments.

8. The system of claim 7, wherein the progress status further comprises a visual indicator representing a time countdown for selecting one of the target video content segments.

9. The system of claim 7, wherein the progress status further comprises a visual representation of one or more of the target video content segments.

10. The system of claim 1, wherein the operations further comprise:
receiving a user interaction with the branching video;
based on the interaction with the branching video, adding at least one video content segment to a current video content path; and
updating the progress status to reflect a change in length of the branching video.

11. The system of claim 1, wherein the operations further comprise providing for display a plurality of video thumbnails associated with a point in time in the branching video, the thumbnails comprising previews of different video content segments from different video content paths potentially viewable at the point in time.

12. The system of claim 11, wherein the operations further comprise, upon receiving a selection of one of the video thumbnails, seeking to the video content segment corresponding to the thumbnail.

13. The system of claim 1, wherein the location is later in time than a current location in the branching video and after a branching point that has not been reached in playback of the branching video, and
wherein the navigating comprises automatically selecting a video content path at each branching point in the branching video between the current location and the location later in time.

14. The system of claim 13, wherein the automatic selection is based on previous selections of content video paths made by a plurality of different users.

15. A computer-implemented method for navigating branching video content, the method comprising:
providing for display a progress status of a branching video comprising a plurality of video content paths, each content path comprising a plurality of selectably presentable video content segments, wherein the progress status comprises a navigable video tree structure of one or more of the video content paths, the navigable video tree structure configured to be displayed simultaneously with the playback of the branching video;
receiving a user interaction with the progress status indicative of a navigation of the video tree structure; and
navigating to a location in the branching video based on the user interaction and one or more branching points in the video tree structure, the location is (i) later in time than a current location in the branching video and (ii) after a plurality of branching points and two or more video content segments of the plurality of selectably presentable video content segments that have not been reached in playback of the branching video, and
wherein the navigating comprises automatically selecting a video content path at each branching point, of the plurality of branching points, in the branching video between the current location and the location later in time.

16. The method of claim 15, wherein the navigation of the video tree structure further comprises a navigation to a position in the branching video that is earlier in time than a current position in the branching video.

17. The method of claim 16, wherein the earlier position in the branching video refers to a video content segment not previously viewed by a current user.

18. The method of claim 15, wherein the progress status comprises a navigable video tree structure of a plurality of the video content paths.

19. The method of claim 15, wherein the progress status further comprises one or more statistics associated with the branching video, and wherein the method further comprises updating the one or more statistics in real time.

20. The method of claim 19, wherein the one or more statistics are based on choices made with respect to branching points in the video tree structure by a plurality of different users.

21. The method of claim 15, wherein the progress status further comprises at least one visual indicator identifying a branching point for transitioning from a source video content segment to a selectable one of a plurality of target video content segments.

22. The method of claim 21, wherein the progress status further comprises a visual indicator representing a time countdown for selecting one of the target video content segments.

23. The method of claim 21, wherein the progress status further comprises a visual representation of one or more of the target video content segments.

24. The method of claim 15, further comprising:
receiving a user interaction with the branching video;
based on the interaction with the branching video, adding at least one video content segment to a current video content path; and
updating the progress status to reflect a change in length of the branching video.

25. The method of claim 15, further comprising providing for display a plurality of video thumbnails associated with a point in time in the branching video, the thumbnails comprising previews of different video content segments from different video content paths potentially viewable at the point in time.

26. The method of claim 25, further comprising, upon receiving a selection of one of the video thumbnails, seeking to the video content segment corresponding to the thumbnail.

27. The method of claim 15, wherein the location is later in time than a current location in the branching video and after a branching point that has not been reached in playback of the branching video, and     wherein the navigating comprises automatically selecting a video content path at each branching point in the branching video between the current location and the location later in time.

28. The method of claim 27, wherein the automatic selection is based on previous selections of content video paths made by a plurality of different users.

\* \* \* \* \*